Aug. 17, 1965        M. DANGAUTHIER        3,201,142
AUTOMOBILE VEHICLE SUSPENSION
Filed Sept. 5, 1963                    2 Sheets-Sheet 1
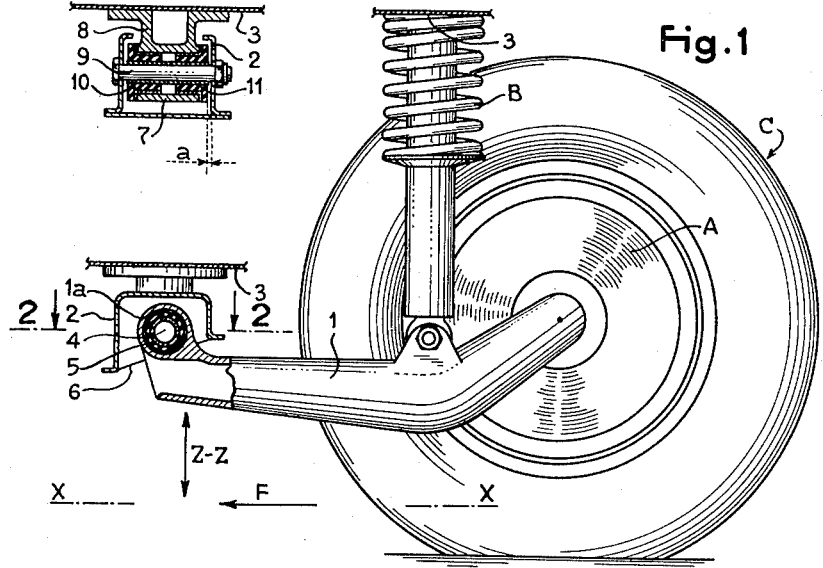
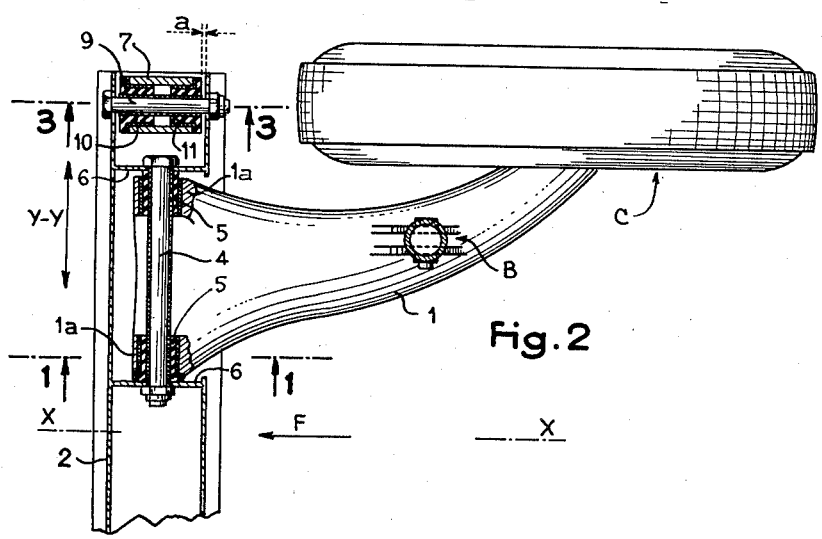
INVENTOR
MARCEL DANGAUTHIER
BY LeBlanc & Shur
ATTORNEYS

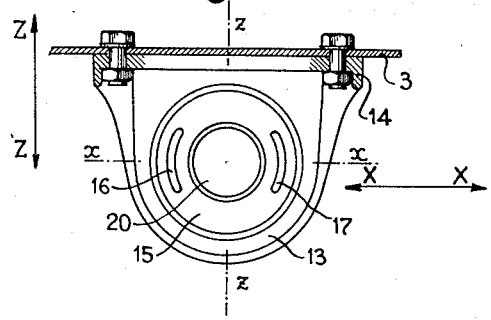
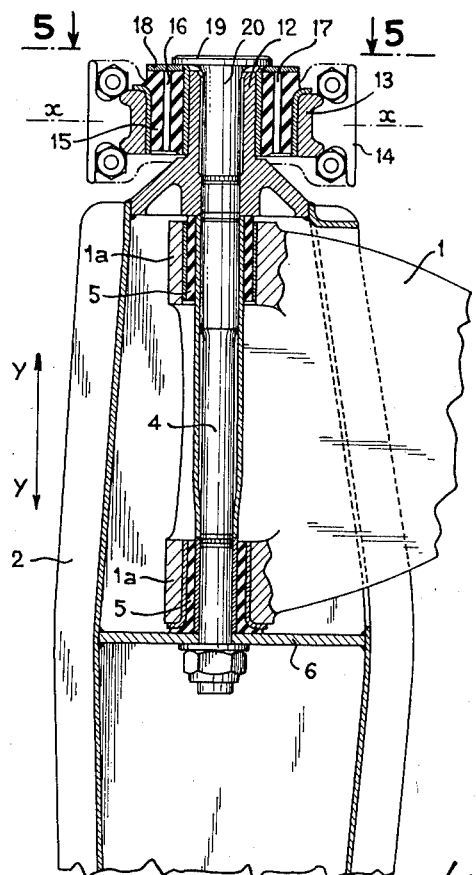

United States Patent Office 3,201,142
Patented Aug. 17, 1965

3,201,142
AUTOMOBILE VEHICLE SUSPENSION
Marcel Dangauthier, Paris, France, assignor to Société d'Etudes et d'Applications Industrielles Commerciales et Immobilieres Inter-Technique, Paris, France, a corporation of France
Filed Sept. 5, 1963, Ser. No. 306,770
Claims priority, application France, Nov. 22, 1962, 916,620
3 Claims. (Cl. 280—106.5)

The present invention relates to a rear wheel suspension for an automobile vehicle in which the rear wheels are carried by trailing arms pivoted to a common cross-member.

In suspensions having trailing arms it is known to connect the latter to the body of the vehicle by means of assemblies which are such that the trailing arms are free to move to a limited extent relative to the body solely in the longiudinal direction; for example, such a type of suspension is disclosed in the Austrian Patent No. 196,257.

However, in known arrangements of this type, the trailing arms associated with each individual wheel can turn about a vertical or horizontal axis and result in a swivelling harmful to the wheel they carry.

The object of the invention is to adapt the aforementioned device to a suspension in which the trailing arms are pivoted to a common cross-member.

According to the invention, masses of an elastomer are interposed between the mounting of the ends of the common cross-member and the body, these masses of elastomer having such shape and being so positioned as to have great flexibility in the longitudinal direction of the vehicle and great rigidity in the vertical and transverse directions thereof and to prevent substantially any pivotal movement of the cross-member about any one of its median axes.

Due to the provision of a cross-member having a great length relative to the dimension of the masses of elastomer, the harmful swivelling or "camber" of the wheels is avoided owing to the very restricted freedom of pivotal movement of the long cross-member despite the flexibility of the mounting of its ends.

In one embodiment of the invention, each end of the cross-member is held in a cylindrical annular bushing of elastomer fixed inside a sleeve rigid with the body, the bushing of rubber being solid in the regions in the vicinity of a vertical axial plane and apertured in the regions in the vicinity of a horizontal axial plane, the apertures affording freedom of longitudinal displacement of the cross-member, and the solid parts of the bushing the desired rigidity in the vertical direction.

In another embodiment of the invention, each end of the cross-member is rigid with a rod extending in a direction parallel with the longitudinal axis of the vehicle, said rod being held in two cylindrical annular bushings of elastomer fixed inside sleeves rigid with the body, whereby the longitudinal displacements of the cross-member is manifested by a sliding of the rods relative to the sleeves with molecular deformation of the elastomer in the direction in which this is possible without important stress, namely in the longitudinal direction of the vehicle, whereas the elastomer resists vertical and transverse forces.

Further features and advantages of the invention will be apparent from the ensuing description, with reference to the accompanying drawings to which the invention is in no way limited.

In the drawings:

FIG. 1 is an elevational view, partly in section taken along line 1—1 of FIG. 2;

FIG. 2 is a plan view, partly in section taken along line 2—2 of FIG. 1;

FIG. 3 is a vertical sectional view taken along line 3—3 of FIG. 2; these three figures showing one embodiment of the invention;

FIG. 4 is a partial plan view, partly in section corresponding to FIG. 2, of a variant of the invention, and FIG. 5 is a sectional view taken along line 5—5 of FIG. 4.

The suspension shown in the drawings comprises for each rear wheel A an axle-carrying trailing arm 1 pivoted to a cross-member 2 which is connected to the body 3 at its ends by means of mountings which are so arranged that the trailing arms 1 have a restricted freedom to move relative to the body. A suspension spring B of any type (mechanical, pneumatic or other spring), for example a coil spring, is interposed between the arm 1 and the body 3. The invention consists in incorporating in the aforementioned mountings at the ends of the common cross-member, masses of elastomer having high flexibility in the longitudinal direction X—X and high rigidity in the transverse direction Y—Y and vertical direction Z—Z.

In the embodiment shown in FIGS. 1–3, the trailing arm 1 (the vehicle moves forwardly in the direction of arrow F) terminates in a boss 1a which has a transverse aperture through which extends a spindle 4 mounted in the cross-member 2, so that the arm is pivotable about the horizontal axis of this spindle. Elastomer bushings or articulation joints 5 are interposed between the spindle 4 and the bore of the boss 1a.

In the presently-described embodiment, the common cross-member is in the form of a welded sheet metal box-like structure. The walls of the structure are cut away in the region in which the boss of the arm 1 pivots on the cross-member and partition walls 6 are welded to the walls of the box-like structure for the purpose of supporting the ends of the spindle 4. The upper wall of the box-like structure is also cut away at the ends of the cross-member to receive the eye 7 of a support 8 fixed under the body 3. This eye has a bore which is parallel with the direction X—X and is traversed by a pin 9 mounted in the vertical walls of the cross-member 2.

Disposed between the pin 9 and the eye 7 are two elastomer bushings or collars 10 and 11 which adhere to the pin and to the bore of the eye. A clearance $a$ is provided betwen the ends of these collars and the inner faces of the vertical walls of the cross-member 2. The elastomer is preferably compressed radially so as to expand axially, whereby the collars 10 and 11 provide high resistance to displacement of the pin 9 in the direction Y—Y or Z—Z but provide only a minimum elastic resistance to its displacement in the longitudinal direction X—X of the vehicle.

When the vehicle travels along an uneven surface, the impacts of the wheels on the asperities of this surface result in longitudinal components which are transmitted to the arms and thus tend to result in noise, vibrations and discomfort. Owing to the described mounting, these forces result in small displacements of the ends of the cross-member relative to the body of a maximum amplitude equal to the clearance $a$ on either side of the position of equilibrium, the elasticity of the collars 10 and 11 tending to return the cross-member to this position of equilibrium.

In the embodiment shown in FIGS. 4 and 5 the spindle 4 is held in position at one end by a partition wall 6 as shown in the embodiment shown in FIGS. 1–3, but at the other end the spindle is engaged in a hollow journal 12 fixed to the end of the cross-member 2. This journal extends through an eye 13 of a support 14, fixed under the body 3, with interposition of an elastomer bushing 15.

The latter has apertures or passageways 16, 17 located in the vicinity of the diameter $x$—$x$ parallel with the direction X—X but it is solid in the vicinity of the diameter $z$—$z$ parallel with the direction Z—Z. The ends of the bushing bear against a washer 18 retained by a flange 19 formed on a rod 20 fitted in the hollow journal 12, so that the bushing 15 offers high resistance to displacement of the journal 12 in the direction Y—Y. It can be seen that this mounting provides high rigidity in the directions Y—Y and Z—Z but a freedom of movement of the journal 12 and cross-member in the direction X—X corresponding to the radial extent of the passageways 16 and 17, with the effect of an elastic return of the journal 12 to the position of equilibrium.

Although specific embodiments of the invention have been described, many modifications and changes may be made therein without departing from the scope of the invention as defined in the appended claims.

Having now described my invention what I claim as new and desire to secure by Letters Patent is:

1. Rear wheel suspension for a vehicle comprising a vehicle body, trailing arms respectively carrying road wheels, a common cross-member on which the trailing arms are pivotally mounted and mounting means mounting the ends of the cross-member on said body, said means comprising for each end of said cross-member, a sleeve rigid with said body, a pin rigid with said cross-member, and at least one cylindrical annular mass of an elastomer interposed between said sleeve and said pin, said annular mass being indeformable vertically and transversely of said vehicle body and elastically deformable longitudinally of the vehicle body, thereby allowing displacements of said cross-member longitudinally of said body.

2. The rear wheel suspension, as described in claim 1, wherein said annular mass is a cylindrical annular bushing of elastomer, said bushing being fixed inside the sleeve and solid in the region of a vertical axial plane of the bushing and apertured in the region of a horizontal axial plane of the bushing, the apertured regions allowing the cross-member to move longitudinally of the vehicle body and the solid regions imparting the required rigidity to the cross-member vertically of the vehicle body.

3. Rear wheel suspension for a vehicle comprising a vehicle body, trailing arms respectively carrying road wheels, a common cross-member on which the trailing arms are pivotally mounted and means mounting the ends of the cross-member on said body, said means comprising for each end of the cross-member, a pin rigid with the cross-member and parallel with the longitudinal axis of the vehicle a sleeve coaxial with the pin and rigid with said body, two cylindrical annular bushings of elastomer interposed between and secured to the pin and the sleeve, the bushings being indeformable vertically and transversely of the vehicle body and elastically deformable longitudinally of the vehicle body, whereby the pins are axially movable in the sleeves and allow displacements of the cross-member longitudinally of the vehicle body.

References Cited by the Examiner
UNITED STATES PATENTS

| | | | |
|---|---|---|---|
| 2,611,627 | 9/52 | Reynolds | 267—20 |
| 2,751,992 | 6/56 | Nallinger | 280—106.5 X |

BENJAMIN HERSH, *Primary Examiner.*

A. HARRY LEVY, MILTON BUCHLER, *Examiners.*

UNITED STATES PATENT OFFICE
CERTIFICATE OF CORRECTION

Patent No. 3,201,142

August 17, 1965

Marcel Dangauthier

It is hereby certified that error appears in the above numbered patent requiring correction and that the said Letters Patent should read as corrected below.

Column 1, line 20, for "longiudinal" read -- longitudinal --; line 26, before "harmful" insert -- or a camber --.

Signed and sealed this 26th day of April 1966.

(SEAL)
Attest:

ERNEST W. SWIDER
Attesting Officer

EDWARD J. BRENNER
Commissioner of Patents